(12) United States Patent
Kartik

(10) Patent No.: US 7,306,181 B1
(45) Date of Patent: Dec. 11, 2007

(54) GUIDE FOR DIRECTING TAPE MEDIA ALONG TAPE PATH WITH REDUCED CONTACT BETWEEN GUIDE AND TAPE EDGE

(75) Inventor: Venkataraman Kartik, Pittsburgh, PA (US)

(73) Assignee: Storage Technology Corporation, Louisville, CO (US)

( * ) Notice: Subject to any disclaimer, the term of this patent is extended or adjusted under 35 U.S.C. 154(b) by 324 days.

(21) Appl. No.: 11/027,543

(22) Filed: Dec. 30, 2004

(51) Int. Cl.
*G03B 1/46* (2006.01)
(52) U.S. Cl. .................. 242/346.2; 242/615.2
(58) Field of Classification Search ............ 242/615.2, 242/346, 346.2; 360/130.2, 130.21, 130.3; 226/190, 193, 194
See application file for complete search history.

(56) References Cited

U.S. PATENT DOCUMENTS

| | | | | |
|---|---|---|---|---|
| 2,588,525 A | * | 3/1952 | Hertenstein, Jr. ......... | 242/615.2 |
| 3,143,270 A | * | 8/1964 | Cohen ...................... | 242/615.2 |
| 3,249,337 A | * | 5/1966 | Neumann ................. | 242/615.2 |
| 3,889,900 A | * | 6/1975 | Nelson ........................ | 242/346 |
| 4,114,751 A | * | 9/1978 | Nordin ..................... | 242/615.2 |
| 5,501,386 A | * | 3/1996 | Kobayashi ................. | 226/190 |
| 5,772,143 A | | 6/1998 | Runyon et al. ............. | 242/346 |
| 5,860,612 A | | 1/1999 | Runyon et al. .......... | 242/346.1 |
| 6,320,727 B1 | | 11/2001 | Cope et al. ............ | 360/130.21 |
| 6,969,021 B1 | * | 11/2005 | Nibarger .................. | 242/346.2 |

FOREIGN PATENT DOCUMENTS

EP     1 128 376 A2     8/2001

\* cited by examiner

*Primary Examiner*—William A. Rivera
(74) *Attorney, Agent, or Firm*—Brooks Kushman P.C.

(57) ABSTRACT

A tape guide is provided for use in routing a tape media, used in a computer or other application, along a pre-specified path of travel. The tape guide is oriented along a vertical axis and comprises three sections or components joined together to form an integral guide structure. An upper section is provided with a concave surface that curves upward to a circular edge around the top of the guide. The guide also includes a cylindrical central section, and a frustoconical lower section having its smaller-diameter end contiguous with the cylindrical section. Thus, the lower section provides a tapered outer surface extending downwardly from the central section. A tape is wrapped around the guide, whereby the tape is directed along its path of travel. As the tape moves along its path of travel, the curved upper section and tapered frustoconical section apply downwardly directed and upwardly directed biasing forces, respectively. The two opposing forces collectively act to maintain the moving tape in an equilibrium position, as it moves along the guide, that avoids contact between the outer edge of the tape and the circular edge or other guide structure.

5 Claims, 3 Drawing Sheets

US 7,306,181 B1

GUIDE FOR DIRECTING TAPE MEDIA ALONG TAPE PATH WITH REDUCED CONTACT BETWEEN GUIDE AND TAPE EDGE

BACKGROUND OF THE INVENTION

1. Field of the Invention

The invention disclosed herein generally relates to a guide for use in directing or routing tape media, of a type used in data storage applications, as it moves along a designated path of travel. More particularly, the invention pertains to a tape guide of the above type that significantly reduces contact between the guide and the edge or edges of the tape. Even more particularly, the invention pertains to a tape guide of the above type wherein upper and lower guide components respectively apply opposing forces to moving tape media, to urge the tape to an equilibrium position that avoids contact between the guide and the tape edges.

2. Description of Related Art

There is a continuing need to achieve higher data storage density and data transfer rates on magnetic tape media, such as tape media that is used for computer data storage and other applications. It is anticipated that this need will result in a migration toward thinner tape as well as an increase in tape transport speed. Current guiding technologies typically use grooved or smooth rollers and stationary guides or posts to guide the tape, wherein the rollers or posts are provided with flanges. The flanges physically contact the edge or edges of the tape, in order to constrain and direct its motion. Such contact between the tape edges and the flanges of the guide is generally undesirable, as it causes tape edge wear that tends to significantly reduce tape life. This problem is likely to be aggravated as tape media thicknesses are reduced in the future. Moreover, impacts between the tape edge and the flanges can cause tape motion that is difficult for the head servo to follow at high tape transport speeds, thereby leading to read/write errors. More particularly, narrower data tracks and higher tape speeds tend to increase track mis-registration, due to inadequate servo bandwidth.

For the above reasons, conventional guiding techniques may prove to be inadequate in future applications of tape storage. Thus, new tape guiding solutions are required that reduce or eliminate contact between the tape edges and the guide flanges, while minimizing any increase in cost, size or complexity of the tape drive. Unfortunately, a number of newer guiding technologies, such as active guiding or pressurized air bearings, have been found to have one or more of these disadvantages.

SUMMARY OF THE INVENTION

The invention generally seeks to reduce or eliminate contact between the edges of tape media and the flanges or other structure of the tape guide, while still effectively guiding the tape media along its intended path of movement. Embodiments of the invention use a novel guide surface geometry to position the tape at a mean or equilibrium position, with only minimal resort to edge guiding under normal operating conditions. In one useful embodiment, a tape guide for use in routing a tape media along a pre-specified path of travel comprises a central component, and first and second end components. The central component comprises a cylindrical section having an axis and first and second spaced apart ends. The first and second end components are joined to the first and second ends, respectively, of the central component to collectively form an integral structure disposed to engage a side of the tape, as it moves along its path of travel. The first and second end components and central component are aligned in coaxial relationship with one another. The first end component is configured to apply a first force to the tape, to urge the tape along the axis toward the second end component and away from an edge member of the first component. The second end component is configured to apply a second force to the tape that is directed in opposition to the first force, the collective effect of the first and the second forces tending to urge the tape to an equilibrium position that substantially avoids contact between the end member and an edge of the tape oriented toward the first end component.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
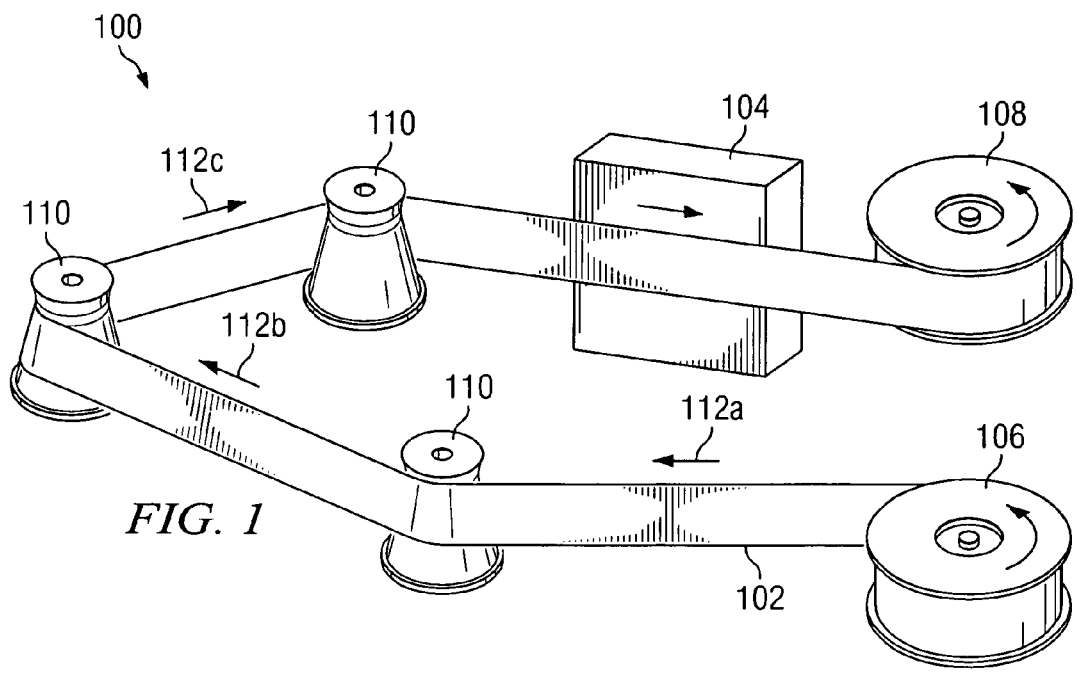
FIG. 1 is a perspective view showing a tape-drive system using a tape guide comprising an embodiment of the invention.

Referring to FIG. 1, there is shown a tape drive system 100 disposed to move a magnetic tape or tape media 102 with respect to a tape read/write head 104. Tape media 102 is thereby enabled to provide data to or receive data from tape head 104. While tape drive system 100 could be used for data storage and retrieval in a computer system, the present invention is not limited thereto. For example, tape drive system 100 could be used in connection with storage or retrieval of video data or the like.

FIG. 1 shows system 100 having tape reels 106 and 108, driven by a motor or motors (not shown) to move tape media 102 along a path of travel or movement that is generally indicated by arrows 112a-c. FIG. 1 shows further that the tape path of travel must change directions several times, as it is routed between reels 106 and 108 and passes tape head 104. Accordingly, tape guides 110 are located at different positions along the path of travel, and tape 102 is partially wrapped around each guide to accomplish respective direction changes. Each of the guides 110 is designed in accordance with an embodiment of the invention, to achieve purposes thereof.

Figure 2:
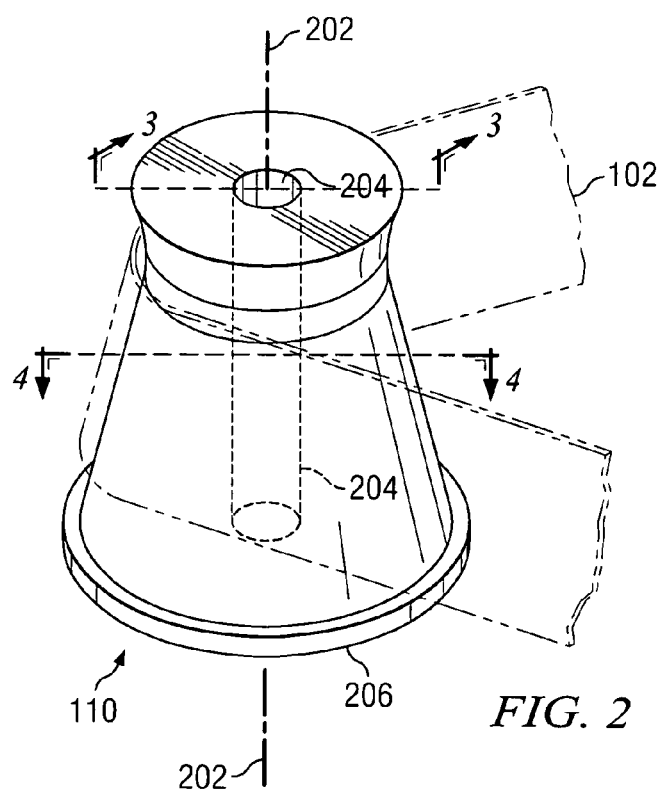
FIG. 2 is a perspective view showing the embodiment of FIG. 1 in greater detail.

FIG. 2 is a perspective view showing one of the tape guides 110 in greater detail. The guide 110 is aligned along a vertical axis 202, and is mounted by means of a pin/shaft 204, also aligned along vertical axis 202. In some applications pin 204 will be fixed in place, and guide 110 will be able to rotate around the pin, possibly using bearings. In other applications guide 110 will be fixably held in place by pin 204, as an immoveable post that would not be able to rotate.

FIG. 2 further shows tape guide 110 provided with a bottom flange 206. Flange 206 is of circular configuration, and extends around the lower edge of guide 110, as viewed in FIG. 2.

Figure 3:
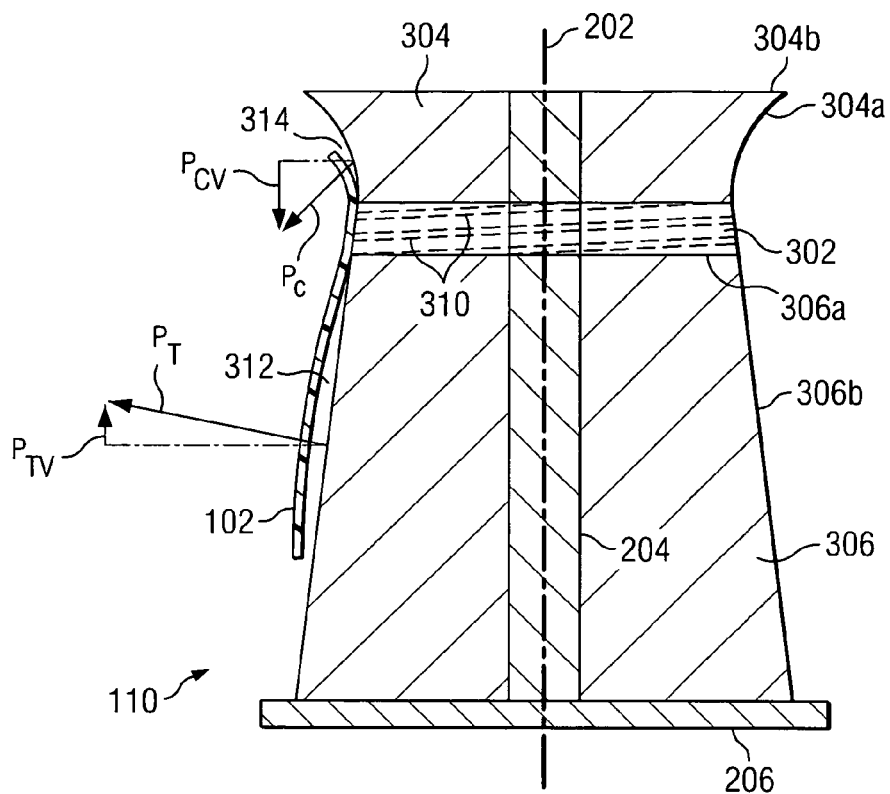
FIG. 3 is a sectional view taken along lines 3-3 of FIG. 2.

Referring to FIG. 3, there is shown tape guide 110 comprising a single structure having three distinct components 302, 304 and 306. More specifically, component 302 is a central component comprising a conical section, and component 304 is an upper section that is provided with a concave surface 304a. Concave surface 304a curves upward from central component 302, as viewed in FIG. 3, and also curves outward from central component 302 to a circular edge 304b around the top of guide 110. Component 306 is a lower section comprising a frustoconical section that extends downward from central component 302, as viewed in FIG. 3. The smaller end 306a of lower component 306 is joined to cylindrical component 302, so that component 306 also extends outwardly as it extends downward, to form a tapered surface 306b. The axes of the three components 302, 304, and 306 are respectively aligned with one another, along axis 202.

The operating principle of the self-centering guide 110 of the invention may be understood by considering the effects of the three components 302-306 on a moving data storage tape 102. When a tape drive 100 is not operational, or when there is no tension applied by wheels of motors of the drive to the tape, the tape rests on its edge on the bottom flange 206 on the tape guide. As the tape 102 starts to move over the guide surface due to the application of the tension and the rotation of the wheels, and if the tape has a sufficient wrap around the guide 110, a film of air, also known as an air bearing, develops between the tape 102 and the surface of the guide. The air bearing pressure diminishes as one nears the edges of the tape.

FIG. 3 further shows the cylindrical central component 302 of guide 110 provided with circumferential grooves 310. More particularly, the grooves 310 are formed around the circumference of the outer surface of the cylindrical component 302. The grooves act to continually bleed air away from the space between cylindrical component 302 and the tape 102, to prevent any air bearing or film from developing therebetween. As a result, the outer surface of cylindrical component 302 generally remains in contact with tape 102 as the tape moves, and applies friction damping to the tape.

The grooves formed in component 302 also serve to decouple air bearings 312 and 314 from each other. Air bearing 312 is developed between tape 102 and tapered surface 306b of lower guide component 306, when tape 102 is moving. Air bearing 314 is similarly developed between tape 302 and the concave surface 304a of upper guide component 304. Appropriate selection of the dimensions of the guide components 302-306 results in the air bearing existing predominantly in the tapered surface 306b of lower component 306. In contrast, the comparatively small dimensions of upper guide component 304 result in a weak air bearing over the concave surface 304a thereof.

In the arrangement shown in FIG. 3, the pressure due to an air bearing at any point on a surface is generally directed perpendicular to the surface. Thus, the air bearing 312, over the tapered surface 306b of lower guide component 306, generates a pressure $P_T$ having a vertical component $P_{TV}$ that biases the tape 102 upwardly, toward the concave surface 304a of upper guide component 304. The air bearing 314, between tape 102 and upper guide component 304, generates a pressure $P_C$ that applies a downward-directed vertical force component $P_{CV}$ to the tape 102. Moreover, a further downward directed biasing force may be applied to tape 102 that results from contact between concave surface 304a and the upper portion of tape 102. Relative contribution of these two downward-acting forces depends on the respective dimensions of the guide sections 302-306, as well as the operational characteristics of the tape drive system.

Because of the curvature of surface 304a, the downward vertical force $P_{CV}$, generated by air bearing 314, increases as a non-linear function of the vertical or upward displacement of tape 102. That is, the curvature of upper component 304 provides a non-linear stiffness characteristic over component 304. Thus, as the tape moves higher along the guide, the curved surface of upper guide component 304 applies a progressively higher downward force $P_{CV}$ to the tape 102. On the other hand, the upward vertical force $P_{TV}$, resulting from interaction between tape 102 and the tapered surface 306b of lower guide component 306, only increases as a linear function of the vertical displacement of tape 102. Accordingly, it becomes increasingly difficult for tape 102 to move upwardly along guide 110, whereupon the tape settles into an equilibrium or mean position as it is moving along its path of travel. This equilibrium position is determined by the resultant of the vertical forces $P_{CV}$ and $P_{TV}$. As a very important benefit, the above action of the guide prevents the upper edge of the moving tape from contacting the upper edge or flange 304b of the guide 110, unless the amplitude of the tape motion far exceeds normal design requirements. Moreover, with the above guide configuration, only a relatively small width of the tape is subjected to surface contact with the guide. Such small surface contact is far less detrimental to tape life than contact between the guide and the tape edge, as the tape is being moved along its path of travel.

Figure 4:
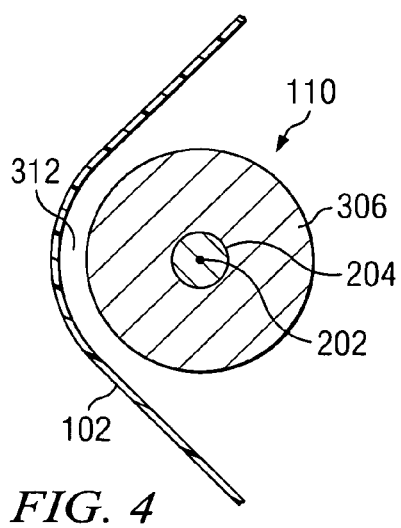
FIG. 4 is a sectional view taken along lines 4-4 of FIG. 2.

Referring to FIG. 4, there is shown tape 102 spaced apart from lower component 306 of guide 110 by the air bearing 312.

Figure 5:
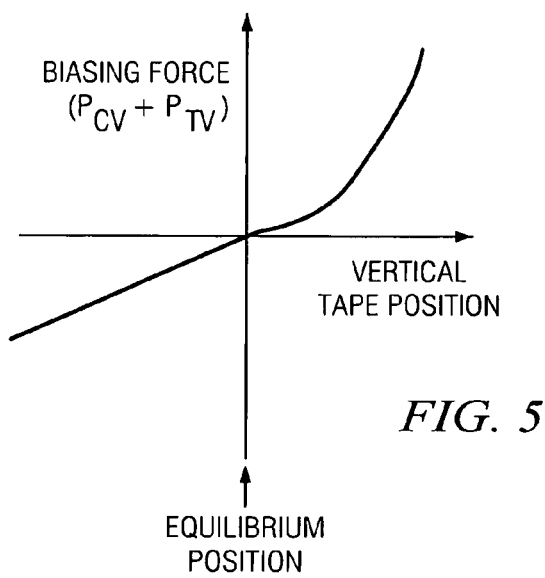
FIG. 5 is a curve showing a biasing force plotted against tape position for use in illustrating important principles of the embodiment of FIG. 1.
Figure 6:
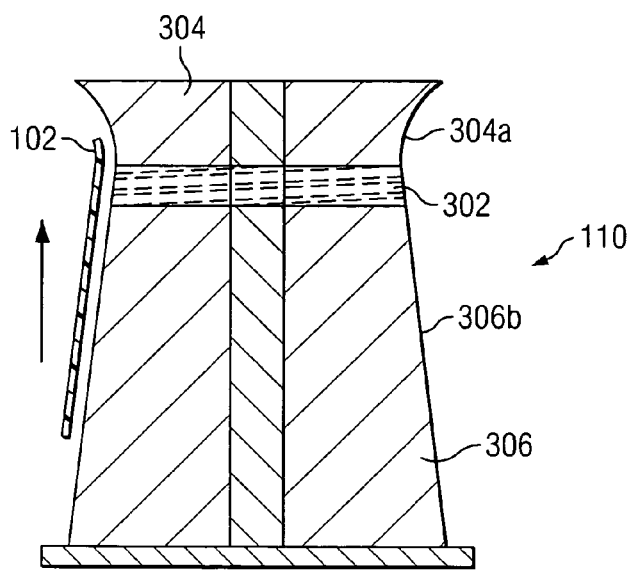
FIGS. 6-8 are sectional views, respectively similar to the sectional view of FIG. 3, that are provided to depict different positions of the tape in response to the biasing forces applied thereto.
Figure 7:
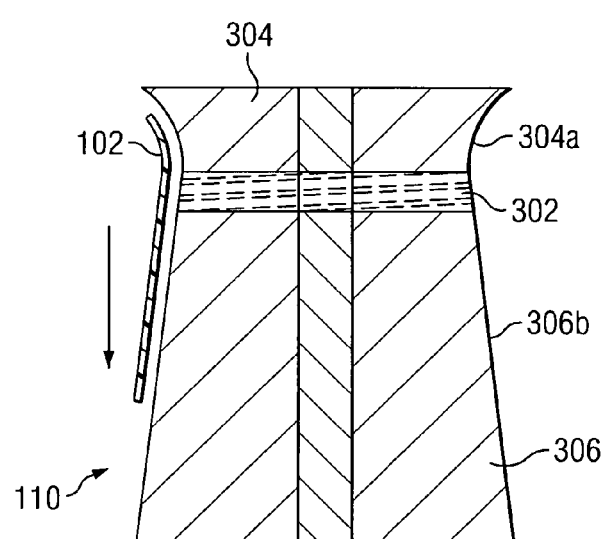
Figure 8:
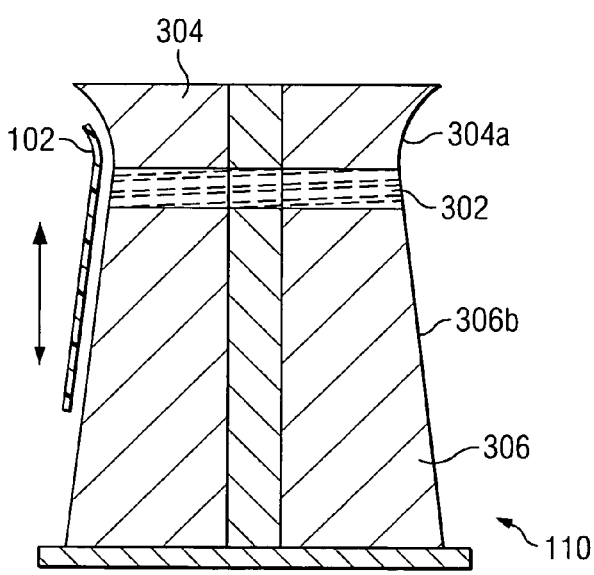

The dynamics of the downward and upward biasing forces $P_{CV}$ and $P_{TV}$, respectively generated by upper component 304 and lower component 306 of guide 110 and applied to the moving tape, are further illustrated by the curve of FIG. 5, and by FIGS. 6-8. FIG. 5 is a plot of the resultant biasing force, applied to move tape 102 vertically along guide 110, versus the tape vertical position. It will be readily apparent that the resulting biasing force is the sum of $P_{CV}$ and $P_{TV}$, with the former force being directed downward and the latter being directed upward.

FIG. 6 shows the tape below its equilibrium position. In this position, the dominant biasing force component is the linear component $P_{TV}$, generated by the tapered surface 306b of lower guide component 306. This force will overcome the force $P_{CV}$ and urge tape 102 upwardly along guide 110.

FIG. 7 shows the tape above its equilibrium position. In this position, the dominant biasing force component is the non-linear component $P_{CV}$, generated by the concave surface 304a of upper guide component 304. This force will overcome force $P_{TV}$, and urge tape 102 downwardly along guide 110.

FIG. 8 shows the tape at its equilibrium position. In this position the opposing biasing forces $P_{CV}$ and $P_{TV}$ balance each other out. Accordingly, the tape tends to remain at its equilibrium position.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape guide for use in routing a tape media along a prespecified path of travel, said tape guide comprising:
   a central component comprising a conical section having an axis and first and second ends in spaced apart relationship; and
   first and second end components joined to said first and second ends respectively, of said central components to collectively form an integral structure disposed to engage a side of said tape as it moves along the path of travel;
   wherein said first end component is configured to apply a first force to said tape, to urge said tape along said axis toward said second end component and away from an edge member of said first component;
   wherein said second end component is configured to apply a second force to said tape that is directed in opposition to said first force, the collective effect of said first and second forces tending to urge said tape to an equilibrium position that substantially avoids contact between said end member and an edge of said tape;
   wherein said first end component is configured to apply a first force to said tape that increases as said tape moves along said axis toward said end member, said first force increasing as a non-linear function of the position of said tape along said axis;
   wherein said first end component is provided with a concave outer surface extending along said axis from said central component, and curving outwardly therefrom to said edge member, the curvature of said outer surface providing said non-linear function associated with said first force;
   wherein said axis is vertically oriented, said first and second end components are located above and below said central component, respectively, and said components are aligned in coaxial relationship with one another;
   wherein said second end component is configured to apply a second force to said tape that increases as said tape moves downwardly along said axis, said second force increasing as a linear function of the position of said tape along said axis;
   wherein said second end component comprises a frustoconical section having a tapered outer surface, the smaller diameter end of said frustoconical section being fixably joined in contiguous relationship with said second end of said central component;
   wherein as said tape moves along its path of travel, said first force is generated by a first air bearing, formed between said concave outer surface and said tape, and said second force is generated by a second air bearing, formed between said tapered outer surface and said tape;
   wherein said first and second air bearings collectively act to enable only a comparatively small portion of said tape, measured along its width, to contact the surface of said integral structure as said tape moves along its path of travel; and
   wherein grooves are formed in the outer surface of said central component, in order to bleed air away from the joint between said central component and any portion of the tape in engagement therewith, and to thereby decouple said first and second air bearings from one another.

2. The tape guide of claim 1, wherein:
   said integral structure is mounted for rotation about said vertical axis.

3. The tape guide of claim 1, wherein:
   said integral structure is fixably mounted about said vertical axis.

4. The tape guide of claim 3, wherein:
   said tape is disposed to wrap partially around said integral structure as said tape moves along its path of travel.

5. A method for selectively positioning a tape with respect to a guide as said tape moves along a path of travel, said method comprising the steps of:
   providing a tape drive system having a tape in contact with a tape guide;
   generating a first force through selected interaction between said tape and a first component of said guide to urge said tape in a first direction along a guide axis;
   generating a second force through selected interaction between said moving tape and a second component of said guide, said second force urging said tape in a direction opposite to said first force, said first and second forces combining to provide a resultant force that urges said tape to an equilibrium position wherein contact between edges of said tape and structure of said guide is not permitted and wherein said moving tape interacts with said first and second components to form first and second air bearings, respectively said first air bearing generating said first force and said second air bearing generating said second force;
   spacing said first and second components apart from one another along said guide axis;
   varying said first force as a non-linear function of the relative displacement of said tape along said axis;
   providing said first component with a concave curved outer surface that is configured to provide a non-linear relationship between said first force;
   varying said tape displacement and said second force as a linear function of the relative displacement of said tape along said axis;
   providing said second component with a frustoconial outer surface that is configured to provide a linear relationship between said second force and said tape displacement;
   positioning a central component of said guide between said first and second components;
   orienting said axis vertically, said first and second components being located above and below said central component, respectively; and
   providing said central component with a conical section provided with grooves to decouple said first and second air bearings from one another.

* * * * *